Feb. 17, 1942.   E. L. CONNELL   2,273,626
TWO-SPEED SANDER
Filed July 11, 1940   2 Sheets-Sheet 1
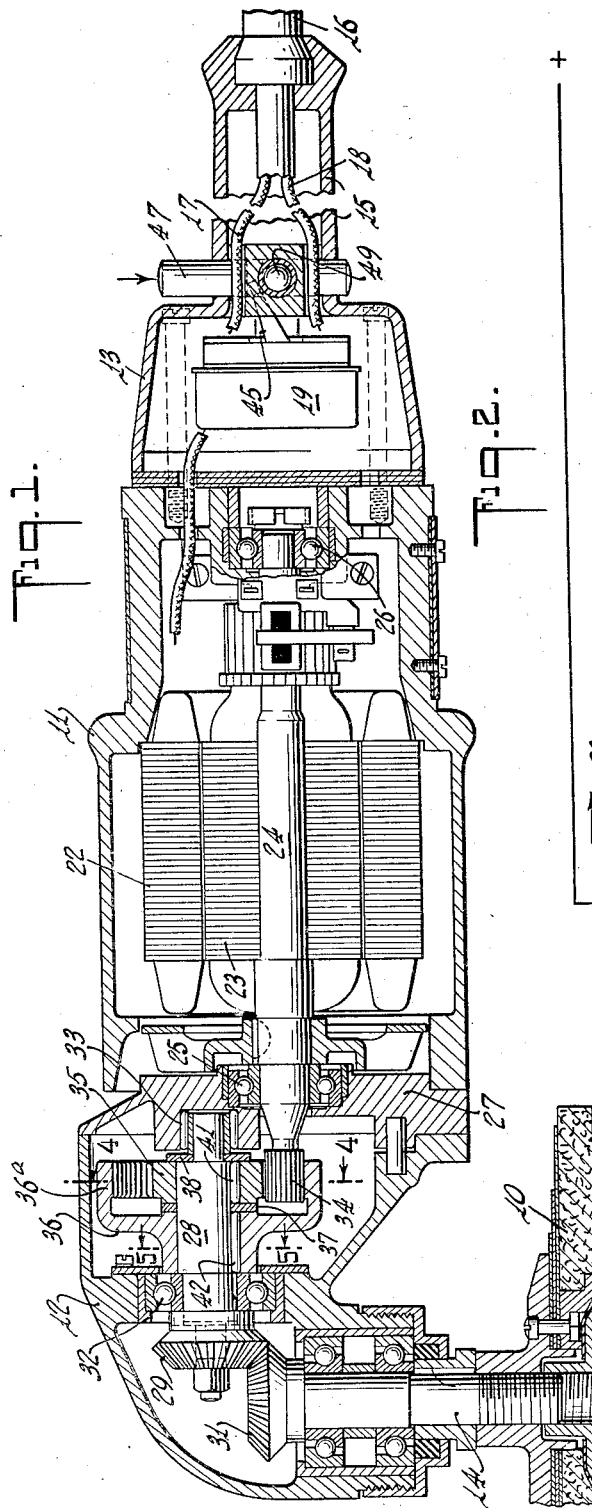
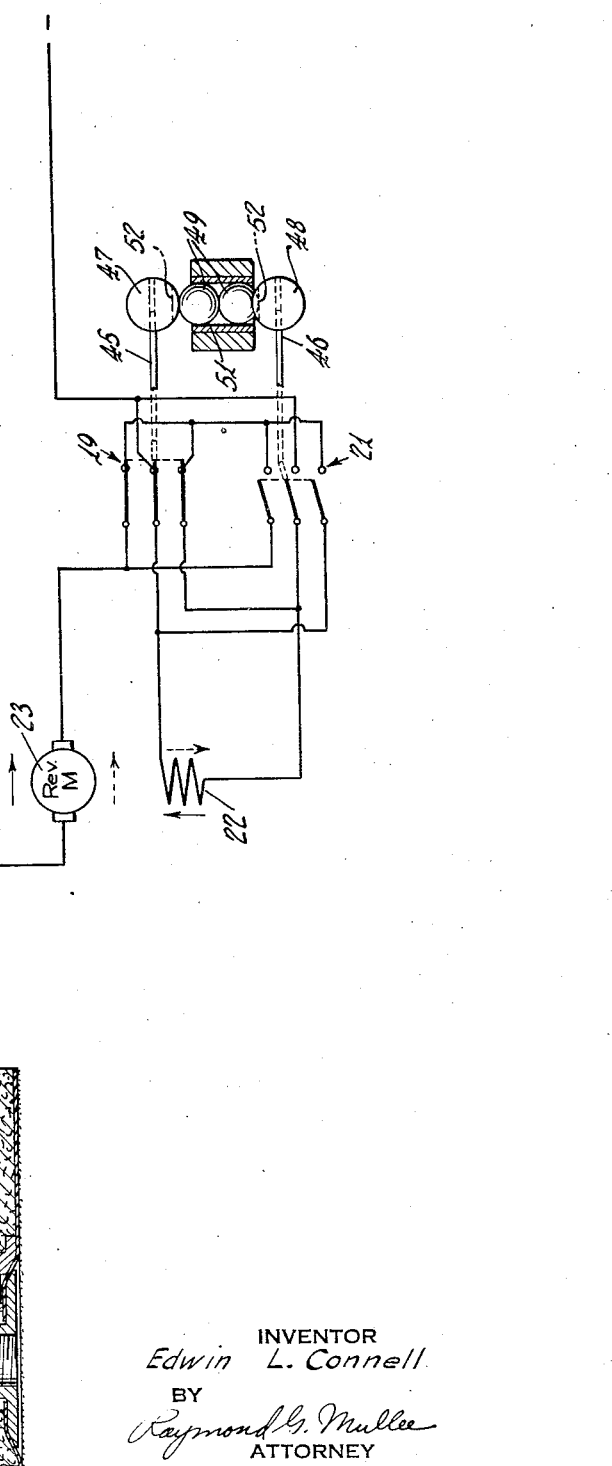
INVENTOR
Edwin L. Connell
BY
Raymond G. Mullee
ATTORNEY

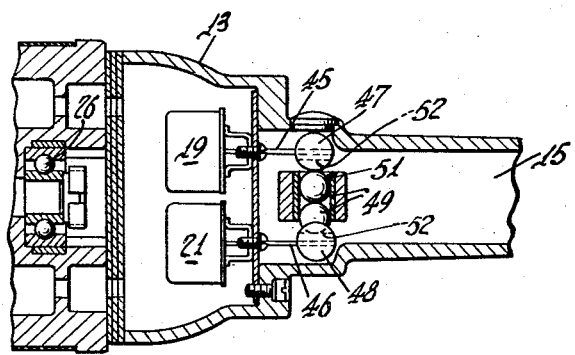
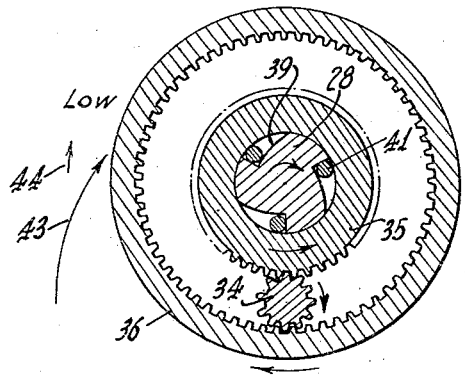
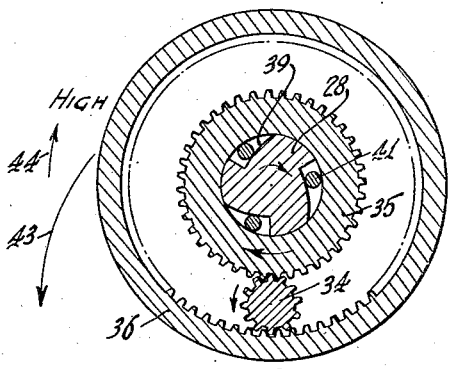
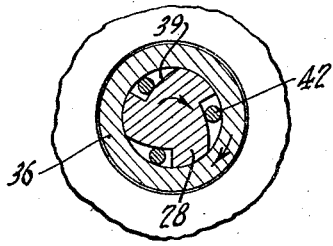
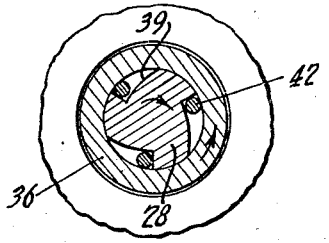

Patented Feb. 17, 1942

2,273,626

UNITED STATES PATENT OFFICE 2,273,626

TWO-SPEED SANDER

Edwin L. Connell, Cleveland, Ohio, assignor to Chicago Pneumatic Tool Company, New York, N. Y., a corporation of New Jersey Application July 11, 1940, Serial No. 344,907

8 Claims. (Cl. 74—367)

This invention relates to change-speed mechanism and has particular application to portable power driven tools having a rotary driving element movable at a constant speed.

It is desirable that tools of this class be capable of operation at more than one speed since a single tool may then be conditioned for use in varying classes of work merely through interchanging of the work performing implements. A common sequence of operations to which the multi-speed tool is adapted, is the sanding of a rough unfinished surface by an abrasive disc, followed by a buffing or polishing of the surface by a working implement appropriately constructed for that purpose. Such sanding and polishing operations are most efficiently performed at different motor speeds and ordinarily require the use of separate tools geared to respective fixed speeds.

One object of the invention is to permit a change from one speed of tool operation to another without the necessity of manual gear shifting.

Another object of the invention is to effect a change in the speed ratio between a power operated driving element and a driven element by changing the direction of rotation of the driving element.

A further object of the invention is to transmit the rotation of a driving element to a driven element through a selected one of two independently operable transmission means, alternatively effective in accordance with the direction of rotation of the driving element.

In carrying out the above objects there has been provided, in the present embodiment of the invention, a pair of independently rotatable transmission gears, a free wheel clutch permitting the gears to transmit rotation to a driven element only during rotation of the gears in one direction, and a driving element rotatable in opposite directions and acting to drive the pair of transmission gears in opposite directions with respect to each other. In this construction, therefore, the tool is capable of two different speeds, one of which is obtained by rotation of the driving element in one direction, and the other of which is obtained by rotation of the driving element in the opposite direction.

Other objects and structural details of the invention will be more apparent from the following description when read in conjunction with the accompanying drawings, wherein:

Fig. 1 is a view, in longitudinal section, of a portable sanding tool embodying the mechanism of the invention;

Fig. 2 is a wiring diagram of a reversible motor, and controls therefor, of a type capable of use in conjunction with the mechanism of the invention;

Fig. 3 is a fragmentary plan view of the handle portion of the tool illustrated in Fig. 1, showing the operating controls in elevation and the remaining parts in section;

Fig. 4 is a view of the transmission mechanism in cross section, and is taken substantially along the line 4—4 of Fig. 1, showing the parts as they appear during low speed operation;

Fig. 5 is a detail view in cross section, taken substantially along the line 5—5 of Fig. 1, showing the manner in which the low speed gear is clutched to the driven shaft during low speed operation;

Fig. 6 is a view similar to Fig. 4, showing the parts as they appear during high speed operation, the high speed gear being now clutched to the driven shaft and the low speed gear being ineffective; and Fig. 7 is a view similar to Fig. 5, showing the low speed gear and its associated clutch mechanism as they appear during high speed operation.

The invention is disclosed as embodied in an electrically powered tool of the type commonly used in sanding, grinding, polishing and like operations. As shown in Fig. 1, this tool is a relatively small and light unit which may be carried in the hands of the operator, when in use, or manipulated while suspended from an overhead support. The work performing element, in the present instance a sanding disc 10, is supported at the front end of the tool, and is given a rapidly rotating motion when applied to the work. The tool is adaptable for use with a variety of kinds and sizes of work performing elements, these elements being selectively used according to the requirements of the work to be done.

The structure of the tool includes a motor housing 11, to the respective front and rear ends of which are secured auxiliary housing sections 12 and 13. The several housing sections are generally circular and cooperate to form an elongated tubular shaped assembly. The outer end of front section 12 is bent at right angles to the longitudinal axis of the housing assembly and supports a spindle 14 to which the sanding disc 10 is secured. The flat lower face of the disc 10 may thus be applied to the work while the tool is held naturally in a position generally parallel to the work. The outer end of rear housing section 13 is reduced in diameter to form a grip portion, or handle, 15. A cable 16, leading from a source of electric current, extends into the handle 15, and separate sets of conducting lines 17 and 18 within the cable are connected to respective switches 19 and 21 (see also Fig. 3) of a dual switch mechanism contained within the housing 13. Supply lines extend from the switches 19 and 21 into the housing 11 and are connected to an electric motor supported therein. The motor comprises the usual stator 22, rigidly supported by the housing 11, and rotor 23 keyed, or otherwise fixed, to a shaft 24 rotatably mounted in bearings 25 and 26. The bearings 25 and 26 are located at opposite ends of the housing 11, the bearing 25 being preferably positioned in a spacing plate 27 secured between the motor housing and front housing section 12. Under the control of the dual switch mechanism current supplied to the electric motor may be so directed as to effect either a right hand or left hand direction of rotation of the rotor 23. That is, the motor is reversible. Conventional means may be provided for controlling operation of the motor and one such means is later briefly described.

The shaft 24 extends forwardly through the spacing plate 27 into cooperative relation with a transmission mechanism whereby the rotary motion of the shaft is transmitted to the spindle 14. Included in the transmission mechanism is a stub shaft 28 having fast on its outer end a bevel gear 29 meshing with a similarly shaped gear 31 on the inner end of the spindle 14. The shaft 28 lies parallel to the shaft 24 and is rotatably mounted in bearings 32 and 33, respectively positioned in the housing 12 and front face of spacing plate 27. The front end of the drive shaft 24 is formed as a toothed pinion 34 and is in constant mesh with a gear wheel 35 loosely mounted on the shaft 28. The gear wheel 35 and pinion 34 are encircled by the flange 36a of a second gear wheel 36 also loosely mounted on the shaft 28. The inner periphery of the flange 36a is formed with gear teeth in substantially the same vertical plane as the gear 35 and likewise in constant mesh with the pinion 34. Referring also to Figs. 4 and 6, the pinion 34 thus lies between the toothed surfaces of the gear wheels 35 and 36 and acts, during rotation of the drive shaft 24, to turn the gears in opposite directions with respect to each other. It will further be evident that by reason of the disparity in size of the gears 35 and 36 their cyclical speed of operation differs. In a commercial embodiment of the invention, approximately 5.4 revolutions of the shaft 24 are required to turn the gear 36 through one cycle of operation whereas a complete turn of the gear 35 is effected in about 3.4 revolutions of the drive shaft.

The gear wheels 35 and 36 are disposed on the shaft 28 between the bearings 32 and 33 and are prevented from longitudinal movement along the shaft by extension of the hub of gear 36 into contact with the bearing 32 (see Fig. 1) and the provision of washers 37 and 38 which respectively maintain contact between the hubs of the two gears and between the gear 35 and the bearing 33. Although not fixed to the shaft 28 the gear wheels 35 and 36 may be operatively connected thereto through a free wheel clutch mechanism acting to transmit rotation only in one direction. The stub shaft 28 is formed with a plurality of longitudinal grooves or recesses 39 (Figs. 4–7), in its outer surface, adapted to receive separate sets of rollers 41 and 42, the two sets of rollers being separated by the washer 37. The rollers 41 and 42 are normally seated in the deepest portion of the grooves 39 and are held in position within the grooves by the surrounding hubs of the respective gears 35 and 36. In accordance with the well known mode of operation of this type clutch the wheels 35 and 36 may move in a counterclockwise direction (as viewed in Figs. 4 and 6) independently of the shaft 28, whereas clockwise movement of either gear causes its associated set of rollers 41 or 42 to become wedged between the gear hub and more shallow portions of the grooves 39, and thereby connect the stub shaft to the drive shaft 24. Since the gear wheels 35 and 36 always rotate in opposite directions with respect to each other, the sets of rollers 41 and 42 are alternatively effective in accordance with the direction of rotation of the shaft 24. With the shaft 24 turning in a clockwise direction, as shown in Fig. 4, the gear 35 is driven in a counterclockwise direction, and is hence ineffective, while the gear 36 is driven in a clockwise direction and shifts the rollers 42 (see Fig. 5) to transmit the motion of shaft 24 to the shaft 28. With the shaft 24 turning in a counterclockwise direction, as shown in Fig. 6, the above condition of operation is reversed, the gear wheel 36 being now ineffective (see Fig. 7) and the gear wheel 35 effective. The direction of rotation of stub shaft 28 is the same irrespective of the direction in which shaft 24 is turned, but the speed of rotation of the stub shaft varies as the drive is effected through gear 35 or gear 36. In Figs. 4 and 6, the arrow 43 and 44 are indicative of the speed and direction of the shaft 24 and shaft 28, respectively. The arrows 43 illustrate the fact that shaft 24 is reversible and operates at a constant speed, while the arrows 44 indicate that the shaft 28 rotates only in one direction but at different speeds. In Fig. 6 the shaft 28 is being driven through gear 35 and the arrow 44, in this figure, is accordingly lengthened to show that the stub shaft moves at a greater speed at this time than when driven through gear 36, as is the case in Fig. 4. It may be said that the shaft 28 is operating at high speed in Fig. 6 and at low speed in Fig. 4.

It is desirable that the means for controlling the motor be simple in operation and easily accessible in order that a change from one speed to another may be made quickly and without confusion. Preferably, the motor is of the series-wound, commutator type, for use with either direct or alternating current. The present control means includes the separate switches 19 and 21 which are alternatively operable and so arranged as to reverse the connections between the rotor 23 and the coils of the stator 22. A simple reversing circuit is shown diagrammatically in Fig. 2, and is illustrative of a type of motor control system which may be used in conjunction with the mechanism of the present invention. The circuit is self-explanatory and it will be noted that each switch 19 and 21 connects the motor to the source of supply in addition to controlling the direction of flow of the current. Thus, to initiate operation of the motor and effect rotation of the rotor 23 in a desired direction it is only necessary to operate a selected one of the switches 19 and 21. In Fig. 2 the switch 19 is shown operated, or in closed position, with the result that the current flows through the main windings of the stator 22 in the direction indicated by the adjacent arrow in full lines. The arrow in broken lines indicates the direction of flow when switch 21 is closed.

As shown in Figs. 2 and 3, the switches 19 and 21 have respective operating arms 45 and 46 extending rearwardly therefrom and connected to associated plungers 47 and 48. The pair of plungers 47 and 48 are arranged parallel to one another and extend transversely through the handle 15, with their opposite ends projecting outside the handle in position for finger-tip control by the operator. Upon depression of the plunger 47 the switch 19 is actuated to obtain one direction of rotation of the motor shaft 24 and one speed of operation, while depression of the plunger 48 serves to actuate the switch 21 and thereby obtain an opposite direction of rotation of shaft 24 and a different speed of operation of spindle 14. To prevent operation of both plungers 47 and 48 at the same time an interlock between the plungers is provided. This interlock is in the form of a conventional ball lock in which a pair of ball-like elements 49 are disposed in a channel 51 between the plungers. The locking balls 49 are shiftable within the channel 51 and coact with slots 52 in the plungers 47 and 48 to prevent movement of one or the other of the plungers. Thus, when plunger 47 is moved to the depressed position shown in Fig. 3, the balls 49 are cammed out of the path of the descending plunger and pressed into the slot 52 in plunger 48. The plunger 48 is thereby locked in its upper, or non-operated, position and cannot be depressed until plunger 47 is returned upward.

What is claimed is:

1. In a device of the class described, the combination of a driven element, a driving element rotatable in opposite directions, transmission means intermediate said driving element and said driven element, means comprised in said transmission means for effecting a change in speed ratio between said driving element and said driven element in response to a change in the direction of rotation of said driving element, said last mentioned means including a pair of gears rotatable in opposite directions relatively to each other by said driving element each at a different cyclical speed, and clutch means rendering each of said gears effective to transmit rotation to said driven element in one direction only.

2. In a device of the class described, the combination of a rotatable shaft, two gear wheels of different size rotatable independently of each other and mounted on said shaft, clutch means connecting said gear wheels and said shaft and permitting said gear wheels to drive said shaft only during rotation of said gear wheels in one direction, and a reversible driving gear meshing with said independently rotatable gear wheels in such manner as to effect rotation of said wheels in opposite directions with respect to each other and at different cyclical speeds.

3. In a device of the class described, the combination of a rotatable shaft, two gear wheels of different size rotatable independently of each other and mounted on said shaft, a free wheel clutch connecting said gear wheels and said shaft and permitting said gear wheels to transmit rotation to said shaft only during rotation of said gear wheels in one direction, the structure of said clutch including an independent set of rollers for each of said gear wheels, and a reversible driving gear meshing with said independently rotatable gear wheels in such a manner as to effect rotation of said wheels in opposite directions with respect to each other and at different cyclical speeds.

4. In a device of the class described, the combination of a rotatable shaft, a first gear wheel rotatably mounted on said shaft and having an internal row of gear teeth, a second gear wheel rotatably mounted on said shaft and having an external row of gear teeth, clutch means connecting said gear wheels and said shaft and permitting said gear wheels to drive said shaft only during rotation of said gear wheels in one direction, rotatable driving means engaging the internal row of teeth on said first gear wheel and the external row of teeth on said second gear wheel and acting thereby to turn said gear wheels in opposite directions with respect to each other, and a reversible motor for operating said driving means.

5. In a device of the class described, the combination of a reversible rotary motor, a driving gear operated by said motor, a driven shaft arranged parallel to the longitudinal axis of said driving gear, transmission means intermediate said driving gear and said driven shaft including a pair of gear wheels loosely mounted on said driven shaft and meshed with said driving gear in such manner as to enforce turning of said wheels in opposite directions with respect to each other, and a driving connection between said pair of gear wheels and said driven shaft adapted to transmit rotation in one direction only.

6. In a device of the class described, the combination of a reversible rotary motor, a driving gear operated by said motor, a driven shaft arranged parallel to the longitudinal axis of said driving gear, transmission means intermediate said driving gear and said driven shaft including a pair of gear wheels loosely mounted on said driven shaft and meshed with said driving gear, and a clutch establishing a driving connection between one of said gear wheels and said driven shaft during rotation of said driving gear in one direction and establishing a driving connection between the other of said gear wheels and said driven shaft during rotation of said driving gear in the opposite direction.

7. In a device of the class described, the combination of a reversible rotary motor, a driving gear operated by said motor, a driven shaft, a first gear wheel rotatably mounted on said driven shaft and having an internal row of gear teeth meshing with said driving gear, a second gear wheel rotatably mounted on said driven shaft and having an external row of teeth meshing with said driving gear, said first and second gear wheels being thereby constrained to turn in opposite directions, and a driving connection between said first and second gear wheels and said driven shaft adapted to transmit rotation in one direction only.

8. In a rotary tool having a reversible driving shaft and a driven shaft, variable speed transmission between said driving and driven shafts comprising an internal gear and a spur gear both mounted on said driven shaft, a driving gear operated by said driving shaft and meshed with said internal gear and spur gear in such manner as to effect rotation of said gears in opposite directions relatively to each other, and means establishing a driving connection between said internal gear and said driven shaft during rotation of said driving gear in one direction and establishing a driving connection between said spur gear and said driven shaft during rotation of said driving gear in the opposite direction.

EDWIN L. CONNELL.